May 1, 1934.   L. A. SHARP   1,956,879
METHOD OF INSTALLING UNDERFLOOR DUCT SYSTEMS
Filed Jan. 2, 1930   3 Sheets-Sheet 1

L. Alan Sharp
INVENTOR.
Ralph Donath and
BY Paul Purchard,
ATTORNEYS.

May 1, 1934.  L. A. SHARP  1,956,879
METHOD OF INSTALLING UNDERFLOOR DUCT SYSTEMS
Filed Jan. 2, 1930  3 Sheets-Sheet 2

L Alan Sharp
INVENTOR.
Ralph Douath and
BY Paul Purchard
ATTORNEYS.

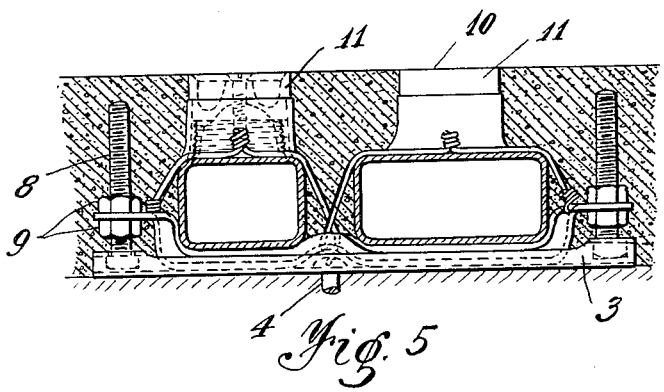
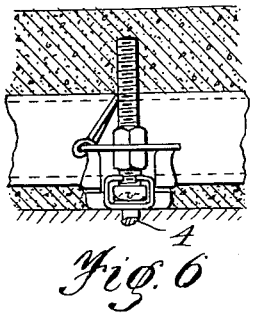
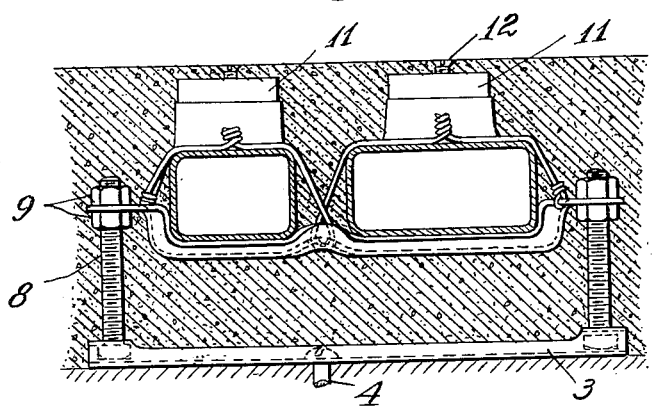
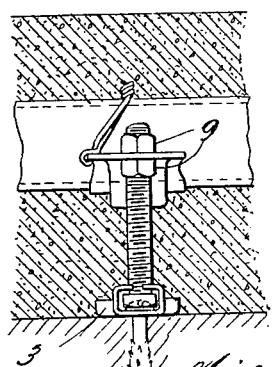
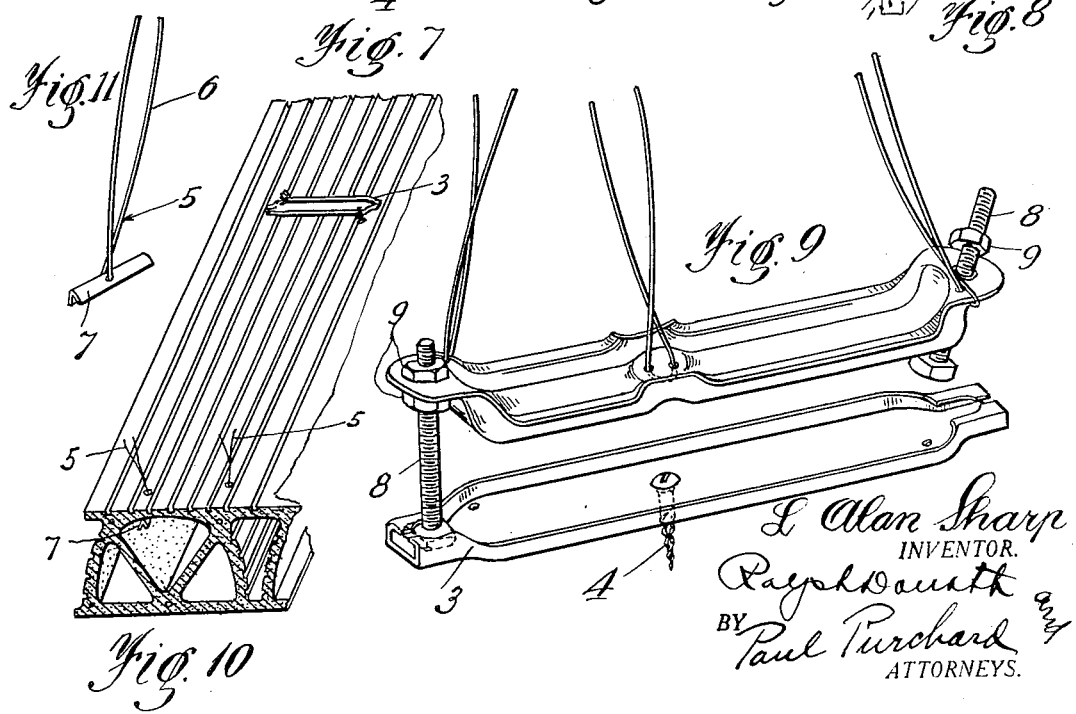

Patented May 1, 1934

1,956,879

UNITED STATES PATENT OFFICE 1,956,879

METHOD OF INSTALLING UNDERFLOOR DUCT SYSTEMS

L. Alan Sharp, Avalon, Pa., assignor to National Electric Products Corporation, Pittsburgh, Pa., a corporation of Delaware Application January 2, 1930, Serial No. 418,134

7 Claims. (Cl. 72—69)

This invention relates to methods of laying electrical conduits, for under-floor wiring systems, and the like.

The primary object of this invention is to devise a method of laying electrical conduits based on the use of a new type of duct-supports invented jointly by J. M. G. Fullman and myself and which forms the subject matter of a copending patent application, Serial No. 326,036, filed by us on December 14, 1928 for under-floor wiring systems. This method comprises definite successive steps which greatly facilitate and expedite this kind of work, and which also assist in properly defining the floor space required by such conduit before the latter is really installed and which, conversely, defines the floor space available for the under-floor installation of other distribution systems such as for gas, water, steam and so forth.

Another advantage of this method of laying under-floor electrical conduit, lies in the fact that the various steps in the installation may be taken after indefinite periods of time, to best suit the working conditions during the construction of a building.

Additional features and advantages of this invention will be dealt with in the following description considered in connection with the accompanying drawings forming a part of this application.

Fig. 5 is a fragmentary cross-section through a finished floor showing the saddle of the duct-support in lowermost position and the outlet ducts of an under-floor duct system flush with a finished floor of reduced thickness.

Fig. 6 is an end elevation of the duct-support shown in Fig. 5.

Fig. 7 is a fragmentary cross section through a finished floor, showing the highest position of the saddle of the duct-support and the outlet plugs below the floor, their location being, wherever required, indicated by marker-screws.

Fig. 8 is an end elevation of the duct-support shown in Fig. 7.

Fig. 9 is a perspective view showing the assembly of the duct-saddle to the base of the duct-support.

Fig. 10 is a fragmentary perspective view of a hollow-tile floor-base on which each base of the duct-supports is to be secured by means of two toggle-wires.

Fig. 11 is a perspective view of a toggle-wire used for fastening the bases of the duct-support to hollow-tile floor-bases.

Figure 1:
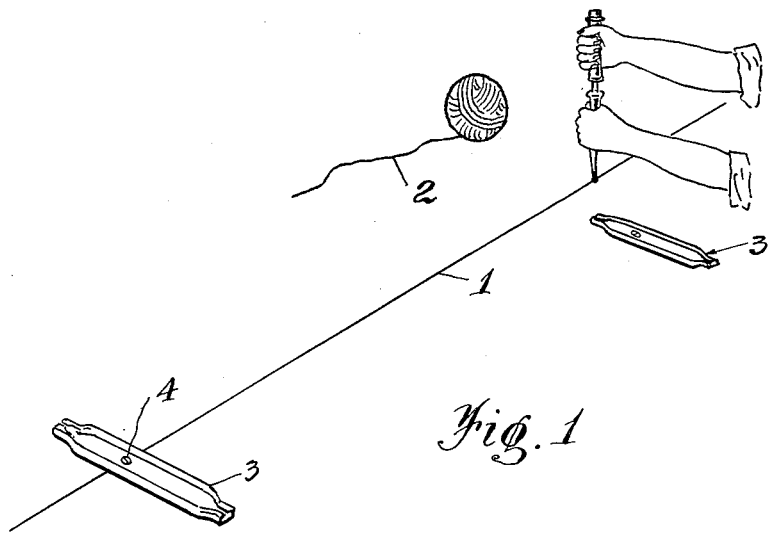
Fig. 1 is a perspective view showing the first operation in the installation of an under-floor duct system according to this invention, said operation consisting in drilling or cutting holes in a floor base, for suitable unitary fastening means for the base of the duct support.
Figure 2:
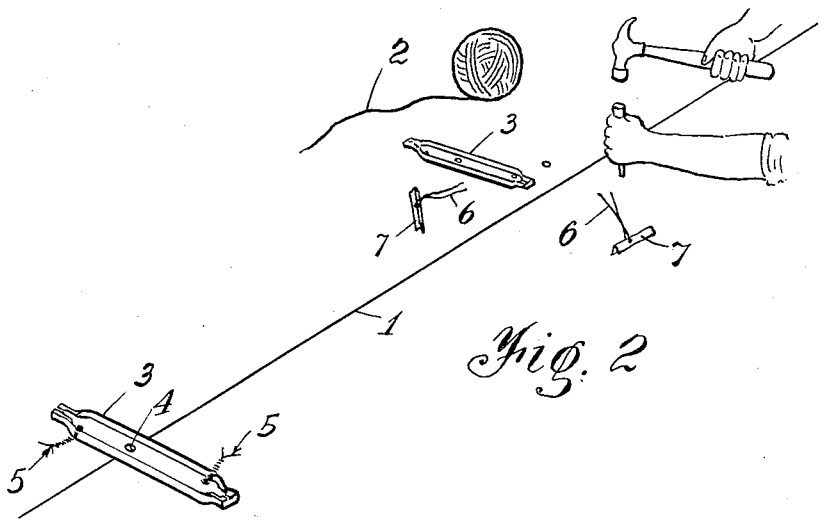
Fig. 2 is a similar view showing the punching of two holes for each supporting base, when the latter is to be fastened on hollow-tile floor base by means of a pair of toggle wires.
Figure 3:
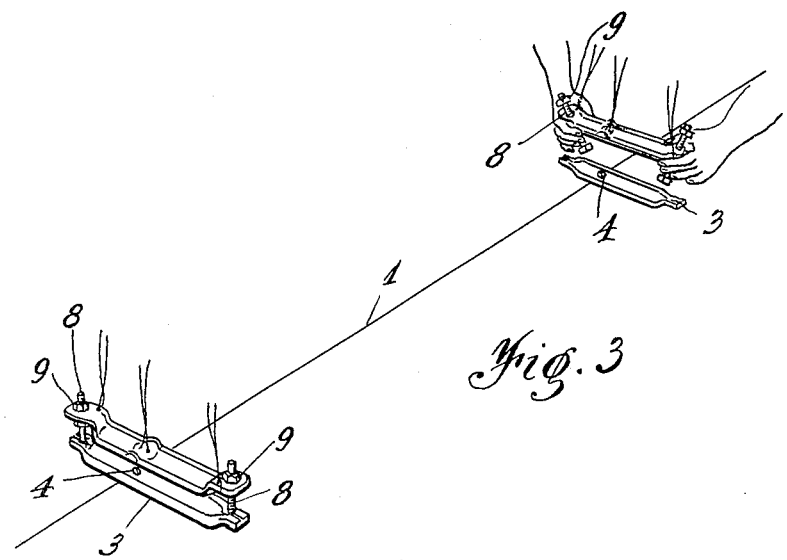
Fig. 3 is a perspective view illustrating the second operation, which consists in assembling the saddle of the duct support to the base thereof.
Figure 4:
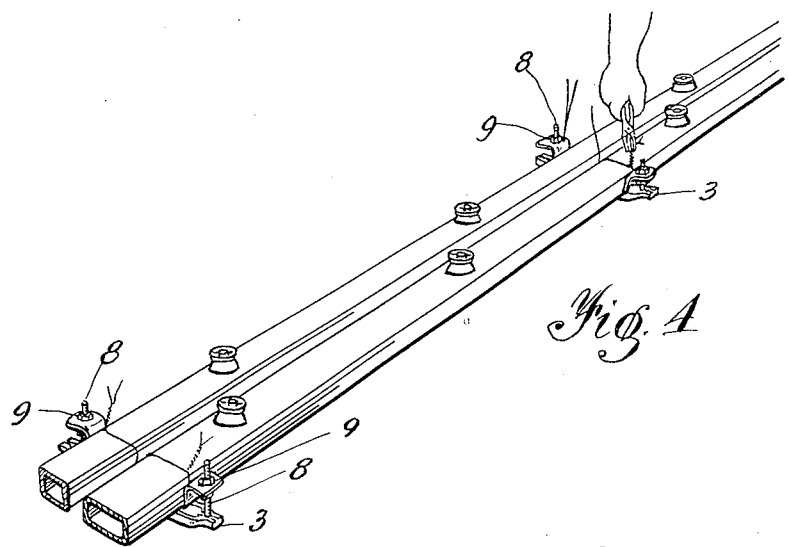
Fig. 4 shows in perspective the third operation, which relates to the act of fastening the ducts to the supports by means of wires, after assembly on the base, as per Fig. 3.

It is the accepted custom in the building trade to give the right of way to the tradesman who lays out his under-floor piping first. The other tradesmen are to be guided by this first layout and must lay their respective pipe systems correspondingly, to avoid interference. If the electrician has provided visible means to properly define the layout of the under-floor conduits, he assists not only himself but also the other tradesmen because other lines of piping or ducts may be routed to avoid interference.

Until the rather recent introduction of the duct-support described in the above mentioned co-pending patent application, Serial No. 326,036, it has been necessary, owing to the kind of structural material heretofore available in the trade to lay out the under-floor duct system, all at one time. This required, of course that the installation would have to be deferred until such time that the floor base could be completely cleared of all obstructing structural material and rubbish. Such time would be anxiously awaited by all tradesmen, having to install their own particular under-floor pipe or duct system, so that it would often happen that several gangs of workmen would be busy on a floor at the same time, thus not only producing unfavorable and time wasting working conditions, but often creating dissension among themselves as to who should have the right of way.

On the other hand, if for instance, a plumber should happen to be first on the job for laying his under-floor system of piping, the electrician would have to wait until the plumbers were practically through with their work and all plumbing material cleared away. Also, the layout of underfloor ducts by the electrician would be governed or partly influenced by the plumbing, thus making the use of cross-overs or the cutting of trenches or channels below the pipes at crossing points necessary.

By following the progressive method which forms the subject matter of this application, the electrician may positively define, with relatively little preliminary work, the course followed by the under-floor duct-system, immediately upon the completion of the floor-base and without having to clear the latter of all obstructing construction material.

Referring to the drawings, the procedure may be briefly described as follows:

Immediately upon completion of the floor base the so-called "layout crew" defines by means of chalk-lines 1 produced by means of a twine 2 coated with chalk of any desired or suitable color, the general course of the under-floor duct-system. Only as much of the obstructing building materials and debris need be removed to one side as is necessary to enable marking the chalk-lines on the floor. This crew then fastens the bases 3 of the duct-supports to the floor base, by either drilling one hole for the holding down screw 4 of the base, if applied to a concrete floor-base; or by punching two holes for the two toggle wires 5 when working on a hollow-tile floor-base. Each toggle wire consists of a wire element 6 bent upon itself and to which is freely attached a sheet metal toggle 7.

Once in place, the bases of the duct-supports will indicate by their general arrangement the course to be subsequently followed by the under-floor duct system and the length of the bases will inform the other tradesmen of the distance they must keep away in order to clear the ducts and prevent any interference therewith.

On account of their shallowness, their rugged constructions, and their positive anchoring to the floor-base, the so installed support-bases offer practically no obstruction to work or traffic on the floor-base; wheel barrows or carts may be pushed over them without greatly increased effort or damage thereto. Also any structural materials, such as sand or fine gravel which may lodge themselves into the bases do not damage them and may be readily removed therefrom.

At any most convenient time after the installation of the bases, the saddle members of the duct supports, as well as the other materials, such as pipes, fittings of all kinds, etc., are brought onto the floor by the so-called "material rushers" to be ready for the next following "installation crew". The latter properly mounts the saddles to the bases by means of bolts 8 and nuts 9, attends to the levelling of the saddles, secures the conduits to the saddles and installs all the other component elements of the under-floor duct-system, such as the outlets, elbows, junction boxes, connectors, and so forth.

After the under-floor conduits and other systems of piping have been installed, the top, or finishing coat of the floor is applied to a thickness at least sufficient to properly cover the conduit or pipe systems. The manner of supporting the conduits on the duct-supports provides a rigid construction which protects the former not only against downward or lateral displacement, but also in an upward direction such as due to the floating action produced by placing a wet concrete mixture on top of the floor-base.

The location of the floor outlets 10 for the conduits is indicated by the plugs 11 of said outlets, when the latter are made flush with the floor, as shown in Fig. 5.

Where the outlet-plugs are covered up by the top-coat of the floor, as illustrated in Fig. 7, a marker-screw 12, screwed centrally in the cap, and brought up flush with the floor is made use of, wherever required.

From the foregoing description it will be apparent that this novel method of laying underfloor electrical conduits, based on the use of separable duct-supports of my invention, offers great labor and time saving advantages over the general practice used heretofore and that the various operations in the laying of the conduit may be performed after indefinite periods of time to suit the convenience of building and electrical contractors.

I claim:

1. The method of installing underfloor ducts which comprises providing a permanent floor base, thereafter establishing a right of way for the duct runs by permanently securing marker members to and upon the upper surface of said previously provided permanent floor base, subsequently securing closed conduits to said marker members upon and spaced from said permanent floor base, and thereafter pouring settable material under, around and over said closed conduits.

2. The method of installing underfloor ducts which comprises providing a permanent floor base, thereafter establishing a right of way for the duct runs by permanently securing marker members to and upon the upper surface of said previously provided permanent floor base, subsequently securing conduit supports to said marker members in spaced relation above the same, securing closed conduits to said conduit supports, and thereafter pouring settable material under, around and over said closed conduits.

3. The method set forth in claim 2 which includes the step of adjusting the vertical distance between the conduit supports and the previously installed marker members.

4. The method of installing an underfloor duct system which comprises providing a permanent floor base, thereafter establishing a right of way for the duct runs by permanently securing marker members to and upon the upper surface of said previously provided permanent floor base, subsequently securing a conduit system including closed conduits and outlet fittings to said marker members with the closed conduits spaced from said permanent floor base, and thereafter pouring settable material under, around and over said closed conduits.

5. The method of installing an underfloor duct system which comprises first providing a permanent floor base; thereafter permanently securing marker members to and upon the upper surface of said previously provided permanent floor base to establish a right of way for the duct runs; subsequently securing conduits, each having floor outlets, to said marker members; and thereafter embedding said conduits in settable material.

6. The method of installing an underfloor duct system which comprises first providing a permanent floor base; thereafter permanently securing shallow marker members to and upon the upper surface of said previously provided permanent floor base to establish a right of way for the duct runs; subsequently securing conduit-supporting saddles to and above said marker members, and securing closed conduits to said saddles; and thereafter pouring settable material under, around and over said closed conduits.

7. The method of installing an underfloor duct system which comprises first providing a permanent floor base; thereafter superimposing marker members upon the previously provided permanent floor base and securing them thereto to establish a right of way for the duct runs; subsequently superimposing duct-supports on said marker members and securing them thereto; superimposing ducts, having floor outlets, on the duct-supports and securing them thereto; and thereafter pouring settable material over said ducts.

L. ALAN SHARP.